Jan. 11, 1949.                H. A. GIROUD                2,458,586
                        SELF-SYNCHRONOUS SYSTEM
                         Filed Oct. 12, 1945
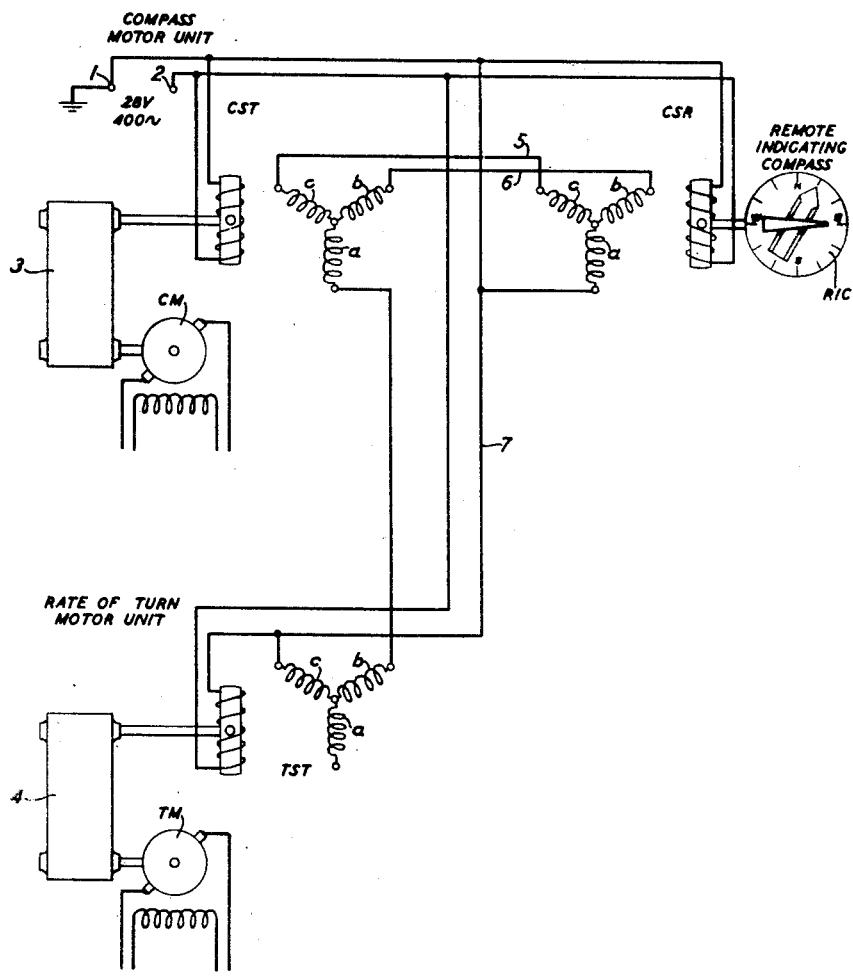
INVENTOR
H. A. GIROUD
BY
P. C. Smith
ATTORNEY Patented Jan. 11, 1949

2,458,586

UNITED STATES PATENT OFFICE 2,458,586

SELF-SYNCHRONOUS SYSTEM

Henry A. Giroud, New York, N. Y., assignor to Bell Telephone Laboratories, Incorporated, New York, N. Y., a corporation of New York Application October 12, 1945, Serial No. 622,064

2 Claims. (Cl. 318—24)

1

This invention relates to an aircraft trainer in which the flight and operational functions of an airplane are simulated and has for its object the provision of means whereby the simulation of the turning error which is normally present in the operation of the remote indicating compass when an airplane turns off a northerly or southerly course is attained.

In an airplane the turning error introduced in the operation of the remote indicating or magnetic compass of an airplane is due to the action of the vertical components of the earth's magnetic field. On a banked turn off a northerly course the compass may show too slow a turn, no turn, or even a turn in the wrong direction, whereas when turning off a southerly course the compass may show too fast a turn. Slow flat turns will not introduce this error.

In the trainer the remote indicating compass is driven by a synchro-receiver which is telemetrically coupled with a synchro-transmitter driven by the motor of a compass motor unit in turn controlled by a compass motor control circuit. This motor control circuit is controlled by potentials representing both the speed of change and the degree of change of a compass needle for any flight condition within the limits of the trainer. The compass heading is a function of the angle of climb, the bank angle, the rate of pitch and the rate of yaw. The effect of rate of pitch on the compass heading is dependent on the angle of climb and the bank angle. For a given rate of pitch the compass heading change becomes greater as these angles increase. With a zero angle of bank the rate of pitch has no effect on the compass heading. The effect of yaw on the compass heading is also dependent on the angle of climb and the bank angle. As the angle of climb increases the effect increases while as the bank angle increases the effect of the rate of yaw decreases becoming zero at an angle of 90 degrees. These compass controlling effects are fully disclosed and discussed in the application of E. J. Fogarty and R. O. Rippere, Serial No. 622,068, filed concurrently herewith and since they do not directly concern the present invention will not be disclosed herein.

In accordance with the present invention the turning error effect is introduced into the telemetric control of the compass by a synchro-transmitter which is driven by the motor of the rate of turn motor unit of the trainer. This transmitter introduces a potential into one of the three legs of the telemetric circuit interconnecting the synchro-transmitter driven by the motor

2 of the compass motor unit and the synchro-receiver which drives the compass, which potential is dependent on the rate of turn, whereby the currents flowing through the stator windings of the synchro-receiver are modified in such a manner that the turning error effect is simulated.

For a clearer understanding of the invention reference may be had to the single sheet of drawing when considered in connection with the following detailed description.

The synchro-transmitters CST and TST and the synchro-receiver CSR are of the self-synchronous type, each provided with three Y-connected stator windings and a single rotor winding. The rotor windings are all energized in parallel from a source of 400-cycle 28-volt alternating current connected to terminals 1 and 2. A system using self-synchronous transmitters and receivers is described on page 737 of the Standard Handbook for Electrical Engineers, published in 1941 by McGraw-Hill Book Company, Incorporated of New York and London. The rotor of the synchro-receiver CSR is suitably connected to the remote indicating compass RIC whereby the rotation of such rotor is instrumental in similarly rotating the needle of the compass. The rotor of the synchro-transmitter CST is driven by the motor CM of the compass motor unit through the reduction gear box 3 and the rotor of the synchro-transmitter TST is driven by the motor TM of the rate of turn motor unit through the reduction gear box 4. The compass and rate of turn motor units are more fully disclosed in the application of E. J. Fogarty and R. G. Rippere hereinbefore referred to.

The corresponding stator windings b and c of the synchro-transmitter CST and of the synchro-receiver CSR are connected together by conductors 5 and 6, the third stator winding a of the synchro-transmitter CST being connected with the stator winding a of the synchro-receiver CSR through the stator windings b and c of the synchro-transmitter TST and over conductor 7. It is to be noted that the third stator winding a of the synchro-transmitter TST is unconnected. While a synchro-transmitter having a Y-connected stator has been disclosed, it will be understood that a rotary transformer having a rotatable primary winding and a stationary secondary winding could be used in place thereof.

It will first be assumed that the simulated flight is due east and that therefore motor CM has rotated the rotor winding of the synchro-transmitter CST into a position in which its axis is parallel to the axis of the stator winding *a* of such transmitter. In the well-known manner the synchro-receiver CSR will be controlled telemetrically until the axis of its rotor winding is also parallel to the axis of the stator winding *a* of such receiver at which time the needle of the compass RIC will be pointing to E on the compass dial.

With the rotor of synchro-receiver CSR parallel to the axis of stator winding *a*, it induces voltages into the windings *a*, *b*, *c* that are essentially equal and opposite to those on synchro-transmitter CST and the system is in equilibrium and a minimum current flows in the system. However, considering synchro-receiver CSR, the voltages induced in the windings *b* and *c* are equal in magnitude and polarity and their vector sum is equal in magnitude and opposite in phase to that of winding *a*. This distribution of voltages in the stator windings results in a similar distribution of the magnetic flux in the stator windings of receiver CSR.

If the line of flight is now held directly east, the distribution of voltages and flux will continue and the compass RIC will continue to indicate an easterly direction of flight. Should the pilot now simulate a turning movement away from the straight line of flight, the rotor of the synchro-transmitter TST will turn into a position in which its axis is not parallel to the axis of winding *a* of such transmitter with the result that potential will be induced into the windings *b* and *c* so that now the current in the circuits through the windings *a*, *b* and *c* of the receiver CSR will either increase or decrease dependent upon the rate of turn movement of the rotor of transmitter TST and dependent upon the direction of movement of such rotor. However, when this potential is introduced into the system, the resultant current flows wholly through winding *a* and divides equally between windings *b* and *c* in the synchro-receiver CSR. The magnetic flux in windings *b* and *c* which have been equal, is changed equally in both windings so that the direction of their vector sum is not affected. The original magnetic flux in winding *a* is also changed but since it is in opposite phase to the vector sum of the fluxes in the windings *b* and *c*, the resultant vector of the magnetic flux distribution changes in magnitude but not in direction. Therefore, there is no interaction between the stator flux and rotor flux to cause the rotor of synchro-receiver CSR to turn. Therefore, on an easterly course the rate of turn transmitter TST will not influence the operation of receiver CSR and the setting of the compass RIC. The same operation also holds true for a turn from a due west heading.

It will now be assumed that the direction of flight is due north at which time the rotors of the transmitter CST and receiver CSR will be positioned at right angles to their *a* stator windings and the needle of the compass RIC will point due north. Under this condition, the rotor of synchro-receiver CSR induces voltages into windings *b* and *c* which are equal in magnitude but opposite in polarity. Also their vector sum is equal in magnitude and opposite in phase to that of winding *a* which is zero. This distribution of voltages results in a similar distribution of the magnetic flux in the receiver CSR. It will also be assumed that the flight is held on a due north course and that therefore the rotor winding of the rate of turn transmitter TST is held in the position shown in which little potential is induced into the stator windings of such transmitter.

Now so long as the rotor of the rate of turn transmitter TST does not move from the position shown, there being no deviation from the due north course, the transmitter TST will not produce any potential effect which will cause current to flow in the *a* stator windings of the transmitter CST and receiver CSR and will cause no change in the current flowing through the *b* and *c* stator windings of the receiver CSR. Consequently the receiver rotor will hold its position of due north.

It will now be assumed that a turn is made to the right from the due north heading. When this turn is made the motor TM of the rate of turn motor unit will operate the rotor of the transmitter TST in a direction representative of the turn to the right and to a degree determined by the rate of such turn. The rotor winding will now be moved to a position in which potential will be induced into the stator windings *b* and *c* of such transmitter. This potential is introduced into the system as previously described and causes current to flow. The total current flows through winding *a* and divides equally between windings *b* and *c* of receiver CSR as previously described. The magnetic flux in windings *b* and *c* is now considerably affected since the entire flux is additive to one winding and subtractive to the other winding resulting in a vector sum that changes in direction as well as in magnitude. Also winding *a* which previously had no flux in it has now a positive flux so that the vector sum of the flux in windings *a*, *b* and *c* is changed in direction as well as in magnitude. The change in direction causes an interaction between the stator flux and the rotor flux thereby resulting in a turning of the rotor of receiver CSR until its flux becomes aligned with the stator flux. Under this influence the rotor turns in a direction to indicate a smaller turn to the right than it would if acted upon by the telemetric influence of transmitter CST alone.

If the rate of turn is more rapid, the potential induced into the stator windings *b* and *c* of transmitter TST is greater thereby causing a greater opposition to the turning of the rotor of the receiver CSR by the transmitter CST so that the rotor will be held in a position indicative of a north heading or no turn.

If the rate of turn is still more rapid, the potential induced in the stator windings *b* and *c* of transmitter TST is still greater thereby causing the rotor of receiver CSR to turn in a direction to cause the needle of compass RIC to show a left turn whereas actually a right turn is being executed.

A rotation of the rotor of transmitter TST in the opposite direction indicative of a change of the rate of turn on a turn executed to the left, will in the same manner cause the receiver CSR to control the needle of the compass RIC to show a turn to the left which may be too slow, to show no turn or to show a turn to the right, dependent upon the rate of turn.

It will now be assumed that the direction of flight is due south at which time the rotors of the synchro-transmitter CST and synchro-receiver CSR will be positioned at right angles to their *a* stator windings and the needle of the compass RIC will point due south. Under this condition the flux produced in the *b* and *c* stator windings of the synchro-receiver CSR will be opposite to the flux produced therein on a due north heading. Consequently, on a rapid turn from the south heading, since the turning of the rotor of the synchro-transmitter TST introduces no different potential change than produced on a turn from a north heading, the fluxes produced by the turning of the synchro-transmitter CST and the synchro-transmitter TST in the stator windings of the synchro-receiver CSR become additive and, consequently, the movement of the rotor of receiver CSR into a position of flux balance is rapid. Therefore, due to the rapid movement of the rotor of receiver CSR, the movement of the compass needle is also rapid. This is equally true on either a right or left turn from a south heading.

Thus by the provision of the rate of turn transmitter TST the operation of the telemetric system which controls the operation of the remote indicating or magnetic compass is so modified as to provide a simulation of the erratic performance of the compass of an airplane when rapid turns are executed when the airplane is on a north or a south heading.

What is claimed is:

1. In a telemetric system a transmitter and a receiver each having a rotatable member and a stationary winding, conductors interconnecting said windings whereby the movement of the rotatable member of said transmitter is effective to cause a corresponding movement of the rotatable member of said receiver, and means interposed in one only of said conductors for producing a variable phase shift between said transmitter and said receiver.

2. In a telemetric system a transmitter and a receiver each having a rotatable rotor winding and three stator windings connected in a three-phase space relationship, a source of alternating current for energizing the rotor windings of said transmitter and said receiver, conductors interconnecting the corresponding windings of said transmitter and receiver whereby the rotation of the rotor winding of said transmitter is effective to cause a corresponding rotation of the rotatable rotor winding of said receiver, a rotary transformer having its stator winding included in series with one of said conductors and having its rotor winding energizable from said source, and means for rotating the rotor of said transformer to produce a variable phase shift between said transmitter and said receiver.

HENRY A. GIROUD.

REFERENCES CITED

The following references are of record in the file of this patent:

UNITED STATES PATENTS

| Number | Name | Date |
| --- | --- | --- |
| 1,637,039 | Hewlett et al. | July 26, 1927 |
| 2,346,693 | Lyman | Apr. 18, 1944 |
| 2,366,603 | Dehmel | Jan. 2, 1945 |

FOREIGN PATENTS

| Number | Country | Date |
| --- | --- | --- |
| 396,537 | Great Britain | 1933 |